(12) United States Patent
Givet

(10) Patent No.: US 6,236,038 B1
(45) Date of Patent: May 22, 2001

(54) OPTICAL BARRIER FORMED OF A SET OF OPTICAL EMITTER AND RECEIVER ELEMENTS

(75) Inventor: Jean-Bernard Givet, Corenc (FR)

(73) Assignee: Schneider Electric SA, Boulogne Billancourt (FR)

( * ) Notice: Subject to any disclaimer, the term of this patent is extended or adjusted under 35 U.S.C. 154(b) by 0 days.

(21) Appl. No.: 09/290,547

(22) Filed: Apr. 12, 1999

(30) Foreign Application Priority Data

May 15, 1998 (FR) .................................................. 98 06157

(51) Int. Cl.$^7$ ...................................................... H01J 40/14
(52) U.S. Cl. .............................................. 250/221; 250/555
(58) Field of Search ................................ 250/221, 222.1, 250/551, 555; 340/540, 541, 555–557

(56) References Cited

U.S. PATENT DOCUMENTS

| | | | |
|---|---|---|---|
| 4,650,990 | 3/1987 | Jonsson | 250/221 |
| 5,015,840 * | 5/1991 | Blau | 250/221 |
| 5,218,196 | 6/1993 | Dogul et al. | 250/221 |

FOREIGN PATENT DOCUMENTS

| | | |
|---|---|---|
| 0 797 109 | 9/1997 | (EP) . |
| 2 278 916 | 12/1994 | (GB) . |

* cited by examiner

Primary Examiner—Que T. Le

(74) *Attorney, Agent, or Firm*—Oblon, Spivak, McClelland, Maier & Neustadt, P.C.

(57) ABSTRACT

An optical barrier is provided by an optical barrier unit that is made up of one or more emitter element modules and one or more receiver element modules. The emitter modules present are controlled by a control circuit to emit modulated beams encoded in a particular manner. In this regard, a particular beam of each emitter module is encoded with one of a pair of unique words that both indicate the identity of the module emitting that beam and further indicate a different binary word value depending on which of the pair is used as part of a further code that will identify the barrier unit. If more than one emitter module is part of the optical barrier, a corresponding number of particular beams, one for each emitter module present, are modulated with appropriate ones of other pairs of unique words to both identify those modules and to provide the proper binary word value as a further part of the optical barrier unit's identification number. The other beams of all of the one or more modules present are modulated with one of two other code words that indicate the high and low binary word values needed to complete the identification number of the optical barrier unit. This permits modules to exchange coded words that identify the barrier unit as well as identifying the modules being used, where the presence of the unique words that indicate the identity of the particular module emitting that particular modulated beam permits synchronization since the receiving element or elements in a particular receiving module intended to receive that particular modulated beam encoded with the identification number for the emitting module are known and what these elements or element actually receives as a modulated beam is easily determined.

9 Claims, 5 Drawing Sheets

| | $C_1$ | | | | $C_2$ | | | | $C_3$ | | | | $C_4$ | | | | |
|---|---|---|---|---|---|---|---|---|---|---|---|---|---|---|---|---|---|
| L1 | C11 | C12 | C13 | C14 | C21 | C22 | C23 | C24 | C31 | C32 | C33 | C34 | C41 | C42 | C43 | C44 | |
| L2 | | | | | | | | | | | | | | | | | |
| L3 | F | | | | E | | | | 7 | | | | E | | | | Barrier number |
| L4 | 1 | 1 | 1 | 1 | 1 | 1 | 0 | 0 | 1 | 1 | 1 | 1 | 1 | 1 | 1 | 0 | |
| L5 | 1 | 2 | 3 | 4 | 5 | 6 | 7 | 8 | 9 | 10 | 11 | 12 | 13 | 14 | 15 | 16 | Beam number |
| L6 | AB | 9B | 9B | 9B | 9B | 9B | 9B | 5B | 5B | 9B | 9B | 9B | 9B | 9B | 9B | 5B | Word code |

Module j

FIG. 4

| F | | | | E | | | | 7 | | | | E | | | |
|---|---|---|---|---|---|---|---|---|---|---|---|---|---|---|---|
| 1 | 1 | 1 | 1 | 1 | 1 | 1 | 0 | 0 | 1 | 1 | 1 | 1 | 1 | 1 | 0 |
| 1 | 2 | 3 | 4 | 5 | 6 | 7 | 8 | 9 | 10 | 11 | 12 | 13 | 14 | 15 | 16 |
| AB | 9B | 9B | 9B | 9B | 9B | 9B | 5B | 5B | 9B | 9B | 9B | 9B | 9B | 9B | 5B |

Module 1

| F | | | | E | | | | 7 | | | | E | | | |
|---|---|---|---|---|---|---|---|---|---|---|---|---|---|---|---|
| 1 | 1 | 1 | 1 | 1 | 1 | 1 | 0 | 0 | 1 | 1 | 1 | 1 | 1 | 1 | 0 |
| 17 | 18 | 19 | 20 | 21 | 22 | 23 | 24 | 25 | 26 | 27 | 28 | 29 | 30 | 31 | 32 |
| 4B | 9B | 9B | 9B | 9B | 9B | 9B | 5B | 5B | 9B | 9B | 9B | 9B | 9B | 9B | 5B |

Module 2

| F | | | | E | | | | 7 | | | | E | | | |
|---|---|---|---|---|---|---|---|---|---|---|---|---|---|---|---|
| 1 | 1 | 1 | 1 | 1 | 1 | 1 | 0 | 0 | 1 | 1 | 1 | 1 | 1 | 1 | 0 |
| 33 | 34 | 35 | 36 | 37 | 38 | 39 | 40 | 41 | 42 | 43 | 44 | 45 | 46 | 47 | 48 |
| 33 | 9B | 9B | 9B | 9B | 9B | 9B | 5B | 5B | 9B | 9B | 9B | 9B | 9B | 9B | 5B |

Module 3

OPTICAL BARRIER FORMED OF A SET OF OPTICAL EMITTER AND RECEIVER ELEMENTS

FIELD OF THE INVENTION

This invention relates to an optical barrier formed of a set of optical emitter and receiver elements, comprising elements emitting or receiving optical beams.

DISCUSSION OF THE BACKGROUND

Optical barriers, also called immaterial barriers, are used particularly to protect operators working near dangerous machines. These barriers are usually composed of a set of contiguous individual beams defining a detection plane. The beams are laid out systematically, since this is necessary to define a detection sensitivity. This sensitivity represents the ability of the barrier to detect intrusion of an obstacle into the barrier. For example, in tests it can be defined by simultaneously blanking off two beams. But it must be certain that the blanked off beams are not replaced by light falling on receivers originating from other beams.

Most barriers used at the present time use one or several light pulses for each beam, in order to setup an emitter receiver dialogue. These pulses are repeated identically for each beam in one or several barriers. The result is the following disadvantages that can result in serious weaknesses:
  lack of certainty about the synchronization of beams between sending and receiving,
  risk of loss of sensitivity,
  possible interference when several barriers are installed close to each other,
  when a failure occurs, it is impossible to know which side is causing it (emitter or receiver).

The operation of a barrier may also be disturbed by parasite reflections of a beam, such that the beam, or a beam forming part of another barrier, is reflected onto its receiver.

These situations may become very dangerous if a barrier is thus completely or partially neutralized by parasite signals.

In general, the problem of reliability and consequently safety of a light barrier depends on the ability to know with certainty that the beam received by a receiver is actually the beam emitted by the emitter associated with it.

It would undoubtedly be possible to identify each beam by a unique code, but this type of solution would require calculation means incompatible with industrial and economic constraints.

OBJECTS OF THE INVENTION

The purpose of this invention is to develop a safety light barrier that can be made with simple means and which can be used particularly to automatically and cyclically verify correct operation.

SUMMARY OF THE INVENTION

Consequently, the invention relates to an optical barrier of the type defined above, characterized in that:
  A—each barrier is identified by a number with hexadecimal digits,
  B—emitter and receiver elements associated with each other through their beam are grouped into modules with not more than 16 emitter and/or receiver elements, elements are in order in each module and are distributed into a group of one or several first elements (beams), and a group of several second elements (beams),
    elements emit/receive beams in accordance with words formed of pulses.
  C—words are formed of binary pulses coded for their identification, and their work cycle is close to or equal to one.
  D—elements of modules of a barrier are coded to assign a word to each element (beam):
    by assigning an elementary binary code to each first element (beam) taken in the order of the modules, and to each second element (beam), the elementary binary code being obtained by:
      transcription of the digits of the hexadecimal number of the barrier into binary code, giving a sequence of binary digits,
      assignment of the binary digit of the binary sequence of the transcribed number, to each position in a module,
    by defining a set of groups of two words for the first module elements and associating two words with the first element of each module, and selecting from these two words the word which has the same elementary binary code as was assigned to the first element of this module, and
    by defining a group of two words associated with each of two binary states, for all second elements in all modules, and by associating the word with the same elementary binary code that was assigned to the second element, with this second element.

Thus in this barrier, each beam is identified by a number, which is consequently a pair of numbers for the second beams and is a single number for the first beams. The first beam in each module of a barrier has a unique code in the barrier, and a quasi-unique code between two barriers since the number of the barriers is different and therefore its binary state is different.

The second beams each have a code, in other words a word that actually corresponds to a double code; the module code which is actually the code of the first beam and the code of the beam inside the module. In order to simplify the description, the first beam or beams are the first beams of a module and the second beams are the other beams of the same module. But the first beams could occupy a different location, for example they could be nested in the second beams. On reception, the situation will be same since the reception module will have receivers associated with the emitters under the same conditions.

In general, given the bijective association between an emitter and a receiver or group of receivers, the concepts of the position of an emitter or of a receiver in a module, and the beam between the emitter and the receiver, will be considered as being equivalent in the description of the invention.

The modulation of the beam by the code assigned to it can be used to determine if the beam received by a receiver is actually the beam that was intended for it. This beam which is intended for it may be either the beam emitted by the emitter associated with this receiver which corresponds to normal operation of the barrier, or it may be the beam emitted by another emitter but intentionally redirected or received by this receiver if the barrier is being scanned obliquely.

Usually, but not necessarily, emitters and receivers exchange a beam in which the modulation for the word defined above is specific to the beam. This operating mode corresponds to a barrier with a very fine resolution or sensitivity.

Beams can also be grouped in pairs, or possibly in groups of three.

In this case, the beams in each pair or triplet will be modulated by the same code word defined as described above for a single beam. This is applicable to the first and second beams.

In general, beams are emitted in sequence by the different emitters in the same module or different emitters in all modules, following cyclic repetition in a given order for the first and second beams in the same module and the sequence of modules such that the beams can be recognized perfectly by the control circuit that manages the associated receivers.

For controls or modifications to the structure of the barrier or its sensitivity, the association between emitters and receivers can be modified simply by changing the scanning program (association of beams between an emitter and one or several receivers) in the optical barrier control and management circuits.

According to other advantageous characteristics:
the number of each module comprises any N=4 hexadecimal digits and the elementary number of positions in each module is equal to not more than 4 N=16;
each word is 8 digits long and it is preceded and terminated by a word start bit and a word end bit.

This choice of the number of digits making up the barrier number provides a large number of coding possibilities such that barriers composed of 16 modules each with 16 beams are possible, which covers almost all cases that may be envisaged.

For checking, it is particularly advantageous to perform oblique optical scanning making use of the optical defect that consists of natural divergence of the beam.

BRIEF DESCRIPTION OF THE DRAWINGS

The invention will be described in more detail below with reference to the attached drawings in which:

FIG. 4 shows an example of coding for beams in a barrier composed of three modules.

DESCRIPTION OF THE PREFERRED EMBODIMENTS

Figure 1:
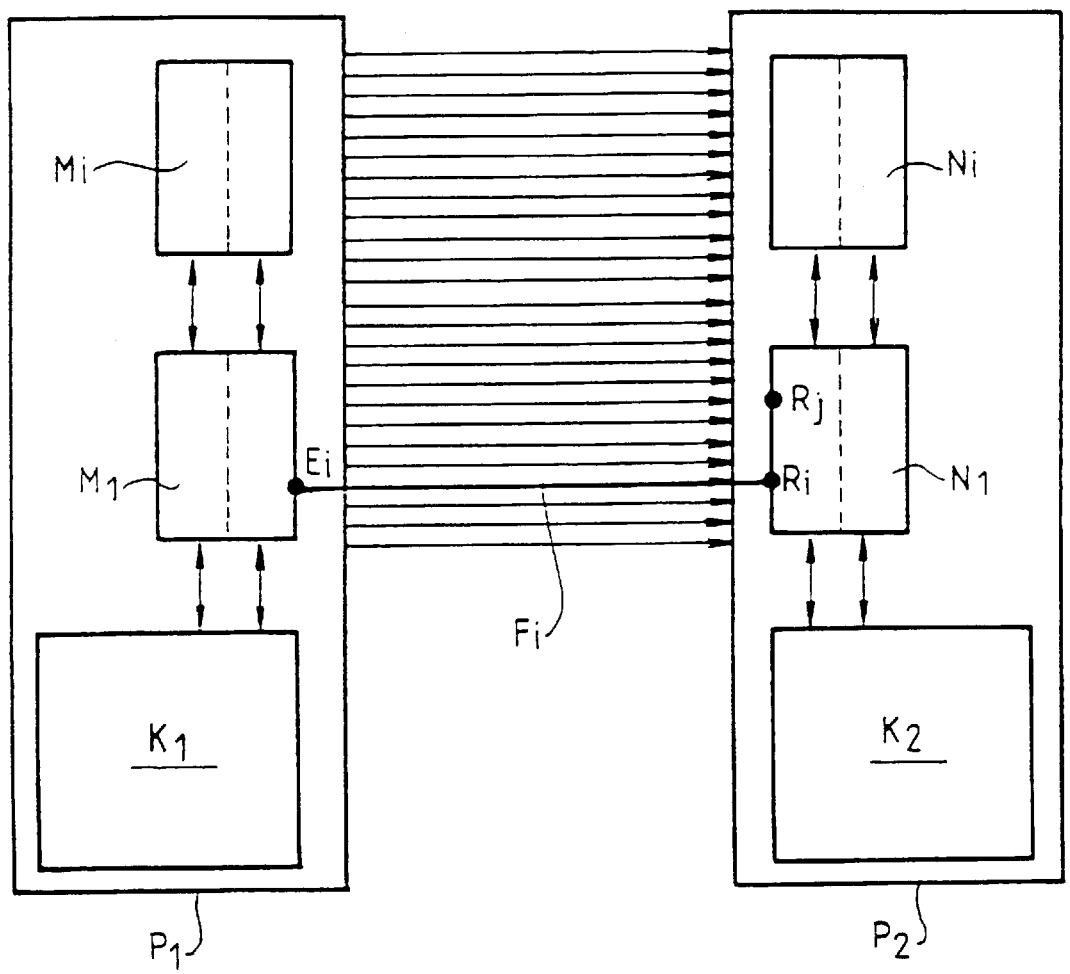
FIG. 1 is an overall view of an optical barrier according to the invention.

According to FIG. 1, an optical barrier is composed of two parts P1, P2, placed at each end of the surface making up the immaterial barrier. These two parts P1, P2 exchange light beams Fi either in one direction only, or in two directions. In the first case, one of the parts P1 or P2 consists of optical emitters only and the other part P2 or P1 consists of optical receivers only; in the second case each part P1 and P2 comprises emitters and receivers associated with receivers and emitters in the other part.

Both of these cases can be envisaged within the framework of the invention.

According to FIG. 1, each part P1, P2 comprises a control circuit K1, K2 managing the emission and reception of beams through modules M1, Mi or N1, Ni. Each module M1, Mi or N1, Ni comprises a known number of emitter elements Ei or receiver elements Ri. For industrial reasons, it is advantageous to make modules which are preferably identical with a determined number of emitter and/or receiver elements. Thus, each part P1, P2 of a barrier may be composed of a number of modules.

Emitters each emit a beam Fi, preferably in sequence or according to a fixed order, to be sent to a specific receiver Ri associated with the corresponding module. This beam transmits a code which is detected by the receiver Ri and enables the control circuit K2 to identify this code and to verify that it actually corresponds to the beam Fi intended for receiver Ri.

When controlled, this installation can also associate a beam Fi emitted by an emitter Ei with a receiver Rj different from the receiver Ri normally associated with emitter Ei.

Emission/reception of beams between parts P1, P2 of the barrier is managed by control circuits K1, K2 which in particular define emission instants of each emitter Ei or group of emitters Ei and reception windows for receivers Ri to increase the security of exchanges in addition to the means provided for this purpose and described below.

According to the invention, a barrier is identified by associating a number with hexadecimal digits with it. This number is unique and forms the serial number or manufacturing number for the barrier. In an industrial installation with several barriers, this can precisely identify each barrier and each element of a barrier.

For example, the number assigned to a barrier is composed of four hexadecimal digits.

As mentioned above, the emitters Ei and receivers Ri are the emitters and receivers of a number of K modules depending on the required surface area of the optical barrier.

Since the barriers are composed of modules, the number of modules will be chosen as a function of the size of the barrier (usually the height for an optical barrier with horizontal beams).

Each module comprises not more than 4 N emitter or receiver elements. These elements are ordered, in other words each is associated with a number in the module.

For example, each module comprises 4 N=16 emitter and/or receiver elements Ei/Ri in the above assumption of N=4.

Figure 2A:
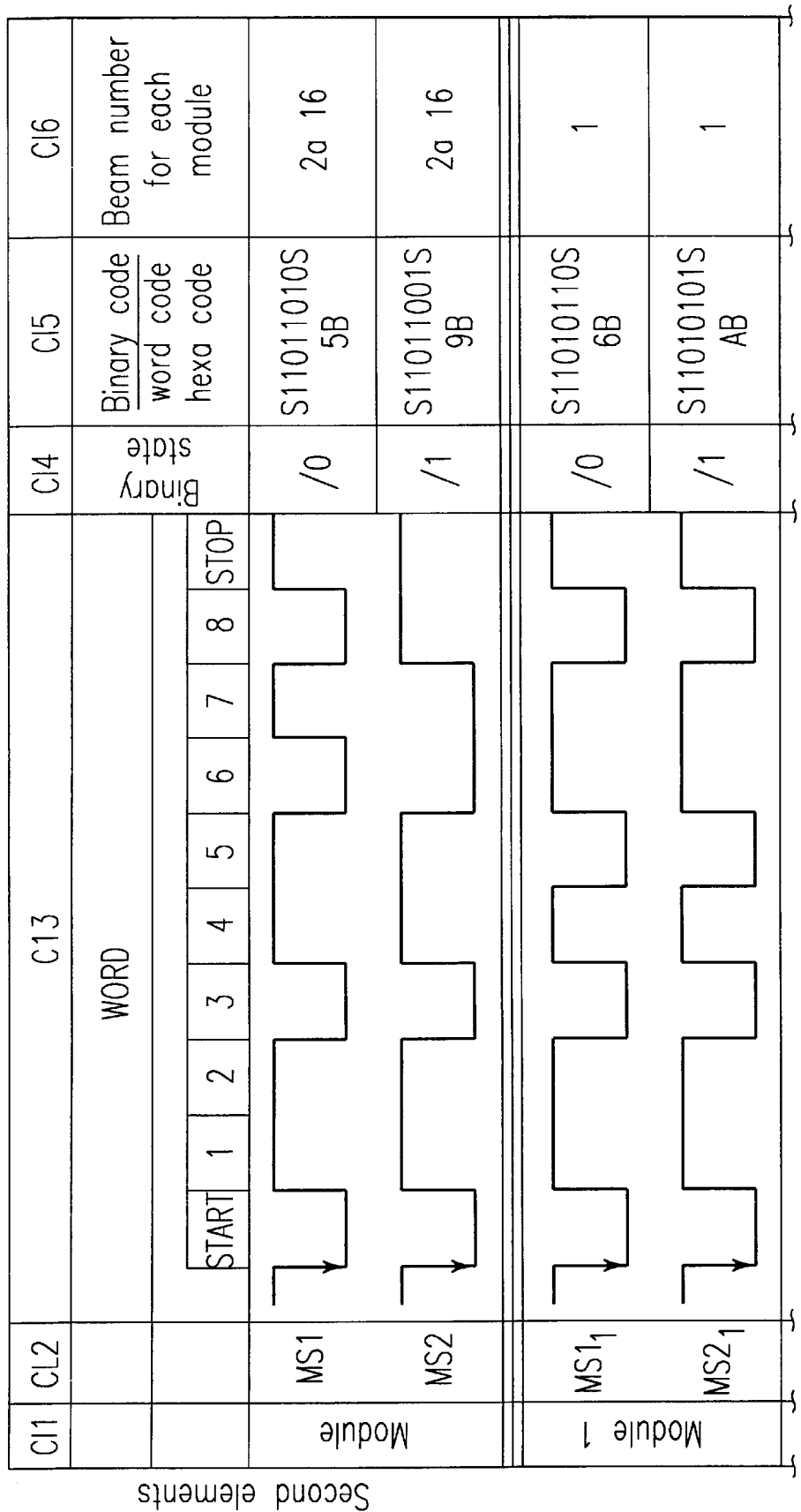
FIG. 2 shows the shape of signals transmitted by light beams between an emitter and a receiver, according to the order of the beams and their code.
Figure 2B:
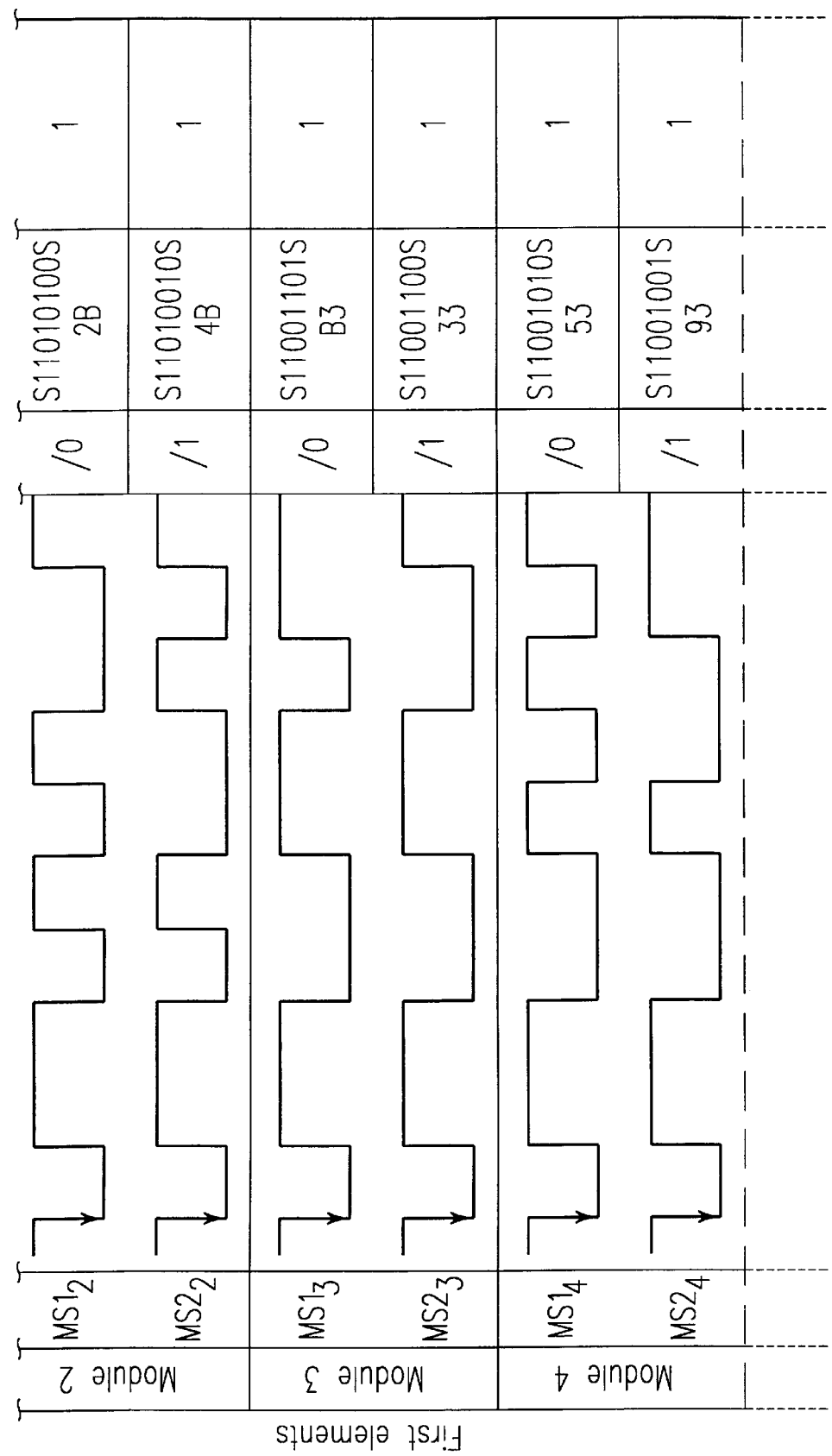

FIG. 2 shows the shape of the codes exchanged between emitters and receivers.

According to the invention, emitter/receiver elements Ei/Ri of each module are distributed in a group of one or several"first" elements and a group of several"second" elements.

Depending on the required sensitivity for the barrier (variable sensitivity depending on the size of the test object that the barrier is required to detect), there may be one, two or three first elements for each module, and the rest of the elements in the module will belong to the group of second elements.

Beams Fi are composed of a sequence of pulses representing a binary code defined as described for the example in FIG. 2. The code associated with a beam is called a"word" and is composed of ten positions or binary states. The word begins with a"start" bit, continues with the 8 bits of the word and terminates with a"stop" bit.

Words were defined such that their working cycle is as close as possible to one. This means that the duration of high states and the duration of low states must be as nearly equal as possible.

In more detail, FIG. 2 shows a table describing the shape of the words associated with the various beams in one or several modules. Columns are referenced by C11–C16 to facilitate the description, while lines and groups of lines are simply defined by the headers.

Column C11 contains modules, column C12 word names, column C13 the shape of words (code), column C14 binary states, column C15 the binary and hexadecimal code of the word and column 16 is a reminder of the beam numbers in each module.

The table is limited to a number of lines representing the shape of the word signal (column C13), but this is simply an example.

Words are distributed into first words MP and second words MS associated with beams or module positions under the conditions described below, respectively.

The second words are presented in the top part of the table before the first words because according to the invention there cannot be more than two second words, whereas the number of first words is equal to twice the number of possible modules.

One of the second words MS1, MS2 corresponds to the binary state 0, and the other corresponds to the binary state 1 (column C14). These second words are associated with all second elements in all modules, except for the first elements. All second beams with the same binary state in all modules will have the same word.

Words MP1i, MP2i of the first elements of modules 1, 2, 3, 4, etc., are denoted MP11, MP21 for module 1, MP12, MP22 for module 2, MP13, MP23 for module 3, etc.

Two signals MP1$_i$, MP2$_i$ are associated with each first element of a module, depending on the binary state 0 or 1 assigned to this first element of the module. The word retained for the first element of the module is the word (out of the two words) that corresponds to the binary state assigned to this element.

Figures 3, 5:
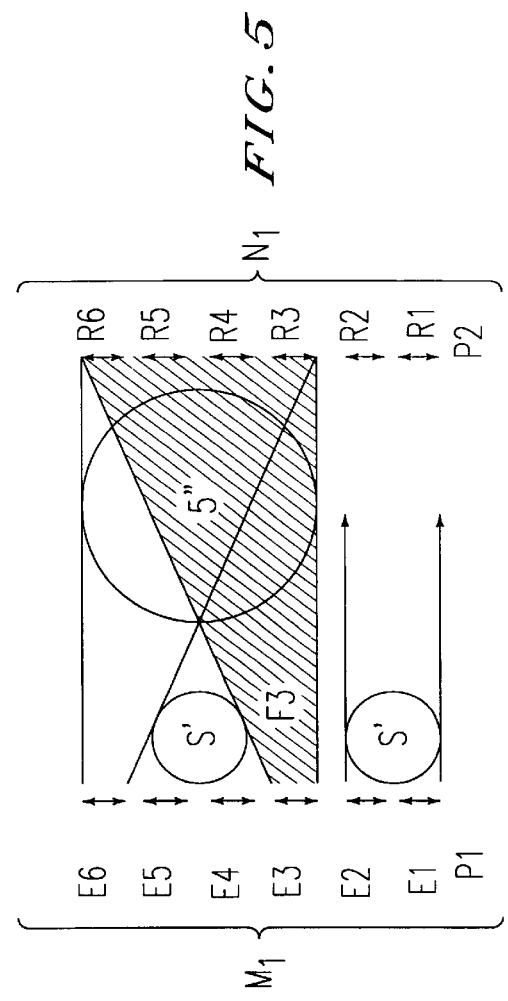
FIG. 3 is a table showing the codes for the various beams in a module.
FIG. 5 is a diagram which explains the problem of control of the sensitivity of an optical barrier.

Binary states are assigned to the first elements and second elements in each module, under the following conditions described in general in the table in FIG. 3.

This table is composed of lines L1, L2, L3, L4, L5, L6 and columns C1 (C11-C14), C2 (C21-C24), . . . , C4 (C41–C44).

Line L1 contains the column headers, and line L2 contains the sub-column headers. Line L3 shows the barrier number, the digits being entered in the respective columns. Line L4 represents the binary transcription of the hexadecimal digits of line L3 (barrier number) in the sub-columns of each column (4 binary states in each column).

Line L5 represents the number of elements (or beams) in the module and in the sub-columns associated with the beam numbers, line L6 contains a hexadecimal code representative of the word associated with each beam number or position number and which will be transported by the light.

It is assumed that module Mi contains 16 emitter or receiver elements, in other words includes 16 beams. The beam or element numbers 1 . . . 16 are entered in line L5 and correspond to sub-columns C11–C44 or columns C1, C2, C3, C4, each containing four adjacent sub-columns.

The barrier to which module Mi belongs is identified by a code with N hexadecimal digits written on line L3. For example, this code could be N=4 and the four digits of the code will then be entered in a column C1, C2, C3, C4.

The binary transcription of the hexadecimal digits of this code is entered in line L4 and in sub-columns C11–C44. Line L4 shows what is also called the "binary state" of a beam or an element (emitter/receiver).

This binary state is used to associate a word according to the table in FIG. 2, to each element or beam. For example, by convention it is assumed that the first beam 1 (L5/C11, table in FIG. 3) is the only element or the first beam. The binary state (L4/C11, FIG. 3) associated with this first beam is equal to 1; if this module is module number 1 in a barrier, the table in FIG. 2 assigns the word MP21 to this element. If its binary state was 0, table 2 would assign the word MP11 to it.

In the case of a single module, by convention the first step is to choose the first words in module 1. This first word also controls synchronization.

For module 2 in the same barrier, the table in FIG. 2 would have assigned the word MP22 (4B) to this beam.

Assignment of words to second beams or elements is easier, but the procedure is similar.

Thus, as shown in FIG. 3, elements or beams 2 to 16 are second elements or beams. For these second beams, the word MS1 or the word MS2 (FIG. 2) is retained, depending on whether the associated binary state is a state 0 or a state 1.

For beam 2, the binary state (L4, C12, FIG. 3) is equal to 1, the word MS2 is associated with it, and is equal to 9B in hexadecimal code. This word code is entered in position L6, C12 (FIG. 3).

The word associated with the third beam is also the word MS2 since its binary state (L4, C13, FIG. 3) is equal to 1.

The code for word MS2 is written in position L6, C13 (FIG. 3) 9B.

In the example shown in FIG. 3, only beams 8, 9 and 16 with binary state 0 will be assigned the MS1 word (5B), for which the code is written in the corresponding location in line L6.

FIG. 4 shows the case of a barrier with three modules.

Line, column and sub-column identification references have not been repeated.

The explanations given with respect to FIG. 3 with reference to FIG. 2 are applicable to each part of the table associated with each module 1, 2, 3 in FIG. 4.

For module 1, the word codes mentioned above will be used.

The situation is very similar for modules 2 and 3.

Since modules M1, M2 and M3 belong to the same barrier, the beams are numbered consecutively from 1 to 48.

The number of the first beam in module 2 is 17. It will be assigned code word 4B. This word is chosen in FIG. 2 from among the two first code words MP12, MP22 that can be assigned to module 2 depending on the binary state. Since the binary state of beam 17 in module 2 is 1, it will be assigned the first word MP22 (4B).

Similarly, the possible choice for the first beam number 33 in module 3 is between words MP13 and MP23 (FIG. 3). Since the binary state associated with this beam 33 is equal to 1, it will be assigned the word MP23.

On the other hand, since the second beams 18–32 or 34–48 in modules 2 and 3 are one of the words MS1, MS2, and since their binary state is the same as the binary state of the corresponding beams in module 1, the words assigned to each of them will be the same.

Using this coding method, each barrier has its identification number repeated every 16 first beams. The result is identification of each product and the means of identifying each beam in each barrier since there is a succession of codes specific to the barrier corresponding to each module.

The first beam in each module gives the module number, and then the number of each first beam is unique. Thus, synchronization between the receiver and the emitter is obtained when the received word is identical to the expected word. The synchronization is thus signed and multiple, the process being reproduced for each module.

This characteristic overcomes the disadvantages of prior art, because:

Synchronization applies to beams identified on the first beam in each module.

If a beam is not received with the code corresponding to the receiver assigned to it, it will be ignored. Sensitivity cannot be lost.

If barriers interfere with each other, they cannot exchange information since they will only be able to interpret the code assigned to them. If any interference takes place, scanning will not result in accepted beams; beams will be unrecognized and synchronization will be impossible. The product output remains inactive, as if the beams had been interrupted.

If the beams are interrupted by obstacles, synchronization is restored at the first beam in the first non-blanked off module since the synchronization sequence is restarted at each first beam in each module.

FIG. 5 diagramatically shows a barrier with two modules M1, N1, one being provided with emitters E1–E6 and the other with receivers R1–R6.

The circles S, S' represent blanking off means, in other words calibrated objects used to check the barrier detection sensitivity.

If the beams were perfectly parallel and nondivergent, the beams from emitters E1, E2 are blanked off by the blanking off device and cannot reach their emitter R1 and R2.

On the other hand, since in practice beams are divergent, for example beam F3 from emitter E3, it will reach receivers R3–R6. But it can only be recognized by receiver R3 which is assumed to be associated with it. This FIG. 5 shows that without coding, and assuming an electronic failure that causes simultaneous emission from emitters E3, E4, E5 and E6, the blanking off device S' would not be detected since the beams from emitters E4, E5 would be blanked off but receivers R3–R6, and therefore also receivers R4 and R5 theoretically associated with emitters E4 and E5, would be illuminated by emitters E3 and E6 and in this case a much larger blanking off device S" would be needed if it was to be detected.

This FIG. 5 explains one interesting possibility of the invention in the case of a failure, to determine if the emitter and/or the receiver that may be defective are in failure. This is done by modifying the emitter/receiver combination to associate another receiver with an emitter and to raise the doubt.

In practice, assume a beam E2 R2 (FIG. 5) in which the optical information is no longer transferred between the emitter and the receiver; the source of the failure is not immediately obvious.

If it is possible to sign the beams, in the event by coding, it is possible to know whether the receiver or the emitter is in failure by using the beams adjacent to the beam that is no longer transmitting.

In the example E1 emits to R2; if R2 responds then E2 is in failure, and this will be confirmed by the beam from E2 not being received by R3.

If R2 does not receive E1, then R2 is in failure which will be confirmed by the beam from E2 being received by R3.

The state of the end beams is obtained by oblique scanning in the other direction, E2 to R1.

This operation may be obtained without coding, but it is made certain by the code contained for each beam.

What is claimed is:

1. An optical barrier unit configured to provide an optical barrier, said optical barrier unit being provided with a unique identification number made up of hexadecimal digits and comprising:

one or more first modules each including M first light elements configured to at least emit light and a corresponding number of second modules, each second module including N second light elements configured to at least receive light, M and N being positive integers; and at least a first control circuit configured to control the one or more first modules so that the M first light elements of each of the one or more first modules emit light beams modulated with different coded words having different binary bit arrangements of a same number of binary bits that have durations of high and low binary values that are equal or nearly equal, said different coded words including, a first type of coded word having a number of predetermined pairs of said binary bit arrangements corresponding to the number of first modules being used in the optical barrier unit, wherein each one of said number of predetermined pairs of said binary bit arrangements uniquely identify which one of the number of first modules the light beam modulated with the first type of coded word is associated with and further indicate a first binary coded word value or a second binary coded word value, and a second type of coded word having only two different predetermined binary bit arrangements that indicate the first binary coded word value and the second binary coded word value, wherein said at least a first control circuit causes each of the one or more first modules present to emit modulated beams in a particular manner relative to the first light elements therein with at least one predetermined one of the modulated beams emitted by each of the one or more first modules present being modulated with one of the predetermined pairs of binary bit arrangements of the first type of coded word so that the at least one predetermined one of the modulated beams emitted by each of the one or more first module present uniquely identifies the corresponding first module while also providing one of the binary coded word values as part of a code indicating the identification number of the optical barrier unit, and wherein any other modulated beams being emitted by each of the one or more first modules present are modulated with one or the other of the two different predetermined binary bit arrangements of the second type of coded word by the at least a first control circuit so that particular binary coded word values are further provided to complete the code indicating the identification number of the optical barrier unit.

2. The optical barrier unit according to claim 1, wherein the identification number of each module includes N=4 hexadecimal digits and the number of ordered light element positions in each module is equal to not more than 4N=16.

3. The optical barrier unit according to claim 1, wherein each of the different coded words is 10 bits long and has 8 coded information bits, a start word bit, and a word end bit.

4. The optical barrier unit according to claim 1, wherein a natural optical defect of beam divergence due to magnification of a beam source is used advantageously to enable oblique optical scanning.

5. The optical barrier unit according to claim 1, wherein each of the light beams is emitted by each of the first light elements separately, is emitted by pairs of the first light elements, or is emitted by three of the first light elements and each of the light beams so emitted is modulated by the same code word by the at least one control circuit.

6. The optical barrier unit according to claim 1, wherein synchronization between the first light elements and the second light elements is achieved by checking that at least the first type of coded word received by any of the ordered light elements and the at least the first type of coded word expected to be received thereby are the same.

7. The optical barrier unit according to claim 1, wherein N and M are equal to or less than 16.

8. The optical barrier unit according to claim 1, wherein the first and second light elements of all modules present can emit and receive light and a second control circuit is provided to control the second light emitting/receiving elements in the second modules present while the at least a first control circuit controls the first light emitting/receiving elements in the first modules present.

9. The optical barrier unit according to claim 1, wherein a second control circuit is included and configured to provide reception windows for the second light receiving elements in the one or more second modules that are present.

* * * * *